United States Patent
Kataoka et al.

(10) Patent No.: US 6,235,331 B1
(45) Date of Patent: May 22, 2001

(54) MODIFIED FISH OIL TYPE MATERIAL CONTAINING HIGHLY UNSATURATED FATTY ACID AND/OR ESTERS THEREOF, AND A COMPOSITION CONTAINING SAID MATERIAL

(75) Inventors: Hisashi Kataoka, Yokoshiba-cho; Satoshi Kiyohara, Ooi-machi, both of (JP)

(73) Assignees: Nisshin Flour Milling Co Ltd; Kenko Corporation, both of Tokyo (JP)

( * ) Notice: Subject to any disclaimer, the term of this patent is extended or adjusted under 35 U.S.C. 154(b) by 0 days.

(21) Appl. No.: 09/363,185

(22) Filed: Jul. 29, 1999

(51) Int. Cl.⁷ .................. A23D 9/00; A23D 9/06
(52) U.S. Cl. ............ 426/330.6; 426/490; 426/542; 426/599; 426/601; 424/523
(58) Field of Search ................... 426/601, 490, 426/599, 542, 330.6; 424/523

(56) References Cited

U.S. PATENT DOCUMENTS

| | | | |
|---|---|---|---|
| 4,826,702 | * | 5/1989 | Hayashi ................ 426/589 |
| 4,853,247 | * | 8/1989 | Barcelon ................ 426/613 |
| 4,895,725 | * | 1/1990 | Kantor ................ 424/455 |
| 4,913,921 | * | 4/1990 | Schroeder ................ 426/321 |
| 4,963,380 | * | 10/1990 | Schroeder ................ 426/330.3 |
| 5,006,281 | * | 4/1991 | Ruben ................ 260/424 |
| 5,084,294 | * | 1/1992 | Schroeder ................ 426/545 |
| 5,304,546 | * | 4/1994 | Comeni ................ 552/545 |
| 5,320,862 | * | 6/1994 | La Tona ................ 426/650 |
| 5,428,026 | * | 6/1995 | Colarow ................ 514/78 |
| 5,456,985 | * | 10/1995 | Zgoulli ................ 428/402.2 |
| 5,853,761 | * | 12/1998 | Kumabe ................ 424/484 |
| 5,885,629 | * | 3/1999 | Ford ................ 426/2 |
| 6,013,294 | * | 1/2000 | Bunke ................ 426/120 |

FOREIGN PATENT DOCUMENTS

| | | | |
|---|---|---|---|
| 2209936 | * | 1/1989 | (GB) . |
| 10-201417 | * | 8/1998 | (JP) . |
| 10-330781 | * | 12/1998 | (JP) . |
| WO 89/05101 | * | 6/1989 | (WO) . |
| WO91/17670 | * | 11/1991 | (WO) . |

\* cited by examiner

Primary Examiner—Carolyn Paden

(57) ABSTRACT

An improved modified fish oil type material which does not generate special fish oil offensive odor after long term preservation and does not generate offensive odor by heating, that is, superior at preservation stability and heat stability, a fish oil type composition containing said material, a method for preparation thereof, an emulsion prepared using said material and composition and foods and cosmetics containing said material, composition or emulsion.

19 Claims, No Drawings

MODIFIED FISH OIL TYPE MATERIAL CONTAINING HIGHLY UNSATURATED FATTY ACID AND/OR ESTERS THEREOF, AND A COMPOSITION CONTAINING SAID MATERIAL

BACKGROUND OF THE INVENTION

1. Field of the Invention

The present invention relates to an improved fish oil type composition having good preservative stability and heat resistance, which does not have a specific offensive fish oil odor after long term preservation and does not generate odor by heating. Further, the present invention relates to a preparation method for said fish oil type composition, an emulsion prepared using said composition and foods and cosmetics containing said composition or emulsion. The improved fish oil composition of this invention contains large amount of highly unsaturated fatty acid types such as DHA or EPA and ester thereof, and can be applied to foods, cosmetics and other uses because of said non odor feature of long term, good preservative stability and heat resistance.

2. Description of Prior Art

Specific kinds of highly unsaturated fatty acid and esters thereof contained in fish oil are known to be useful from the medical and dietetic view points. For example, since eicosapentaenoic acid (hereinafter, shortened to EPA) and its esters have effects to reduce the content of cholesterol in blood and to control thrombus, it is effective for the prevention and the medical treatment of cardiac infarction, cerebral infarction and arteriosclerosis. And docosahexaenoic acid (hereinafter, shortened to DHA) and its ester are known to have excellent effects for the improvement of learning function, antitumor effect, anti-allergy effect and improvement of eye sight. Further, both EPA and DHA have a good effect against atopic dermatitis. Therefore, highly unsaturated fatty acid and its ester are being developed to be applied to the use of foods, healthy foods, cosmetics and drugs, and several kinds of them are already developed and on the market as healthy foods and drugs.

However, the unsaturated bonds of highly unsaturated fatty acid and its ester can easily be decomposed and has a defect to generate specific offensive odor. To prevent this decomposition, the method to add an anti oxidation agent or a deodorant such as natural tocopherol, extract from tea and ascorbic acid are proposed, but these methods are not sufficient to obtain a good result. Further, the method to mix DHA with large amount of starch so as to wrap DHA in starch powder and to make it odorless is also provided. However, when the product obtained by said method is used, not only large amount of starch used for the wrapping of DHA gives bad effects to the taste of foods, but also the offensive odor based on DHA is not prevented, therefore, the possible amount of it to be used is restricted.

Concerning the above mentioned situation, the inventors of this invention have already found that the bread manufactured using starting material to which the suspension composed by DHA based fish oil and vinegar or citrus fruits juice does not generate offensive odor of fish oil and had already disclosed this art in Japanese Patent Laid open publication 7-274806 and Japanese Patent Laid open publication 7-270807. However, the suspension composed by DHA based fish oil (and vinegar or citrus fruits juice is odorless at the preparation of the suspension and can be effectively used at the production of bread. But, when the suspension is left for long term, the offensive odor is regenerated. That is, it is necessary to improve the preservative stability of it.

The inventors of this invention have conduced further intensive study to obtain a fish oil or a highly unsaturated fatty acid or an ester of it derived from fish oil which has good preservative stability and can maintain an odorless state effective for long term preservation. Consequently, the inventors of this invention have accomplished the following technique. That is, to fish oil or to a highly unsaturated fatty acid or an ester of it derived from fish oil, there is added at least one substance selected from the group composed by vinegar or citrus fruits juice and stirred, then the mixture (suspension) is settled so as to separate to oil phase and water phase. After removing of water phase, the oil phase is recovered as the modified fish oil. The obtained modified fish oil containing highly unsaturated fatty acid such as DHA or EPA and/or its ester, does not have an offensive odor in initial stage and does not generate offensive odor even after long term preservation.

The inventors of this invention have conducted further intensive study and have found that by the addition of vegetable oil to said modified fish oil type material, the initial odorless state can be maintained during long term preservation, namely becomes to have a good preservation stability and an offensive odor does not generate even if it is heated. Further the inventors have also found that the clearness of the modified fish oil can be further improved by adding at least one substance selected from the group composed by collagen, starch and agar—agar. At the preparation of foods and cosmetics containing fish oil or highly unsaturated fatty acid derived from the fish oil such as DHA or EPA and/or its ester, the possibility for the heat treatment during the preparation procedure is so many. Therefore, said excellent feature that the addition of vegetable oil to the modified fish oil prevents the generation of offensive odor and maintains an odorless state when it is heated, is very effective from the view point of the practical use of fish oil or highly unsaturated fatty acid derived from the fish oil and/or its ester.

SUMMARY OF THE INVENTION

The main object of this invention is to provide a modified fish oil containing highly unsaturated fatty acid and/or its ester such as DHA or EPA which does not have an offensive odor and maintains an odorless state after preserved for long term (hereinafter shortened to "modified fish oil type material"). And the 2nd object of this invention is to provide a composition containing said modified fish oil type material (hereinafter, shortened to "modified fish oil composition"). The 3rd object of this invention is to provide an emulsion containing said modified fish oil type material or said composition. The 4th object of this invention is to provide foods containing said modified fish oil type material or said composition. The 5th object of this invention is to provide cosmetics containing said modified fish oil type material or said composition. And the 6th object of this invention is to provide medicines containing said modified fish oil type material or said composition.

These objects can be accomplished by adding and mixing at least one substance selected from a group composed by vinegar and juice of citrus fruits to a fish oil material composed by at least one substance selected from a group composed by fish oil, highly unsaturated fatty acid derived from fish oil and its ester, and removing water phase after settling. Hereinafter, said obtained products can be shortened to "modified fish oil type material". And to the obtained modified fish oil type materials, vegetable oil, and at least one substance selected from collagen, starch and agar—agar can be added. These compounds can be called as "modified fish oil composition". Further, these modified fish oil type material and modified fish oil composition can be added to foods, cosmetics and medicines as an emulsifier.

DETAILED DESCRIPTION OF THE INVENTION

Details of the present invention is illustrated as follows.

As the starting material to obtain a modified fish oil type material which can be used for the modified fish oil type material of this invention, fish oil, highly unsaturated fatty acid derived from fish oil or its ester can be mentioned. In the present invention, the term of "fish oil" indicates oil and fat extracted from animals living in water (namely, fish oil in a broad sense) and fish oil extracted from fish (fish oil in a narrow sense), sea animals oil and cod-liver oil are included. All type of said fish oil (fish oil in broad sense) contains EPA, DHA and other types of highly unsaturated fatty acid and/or their esters. And the term of "highly unsaturated fatty acid derived from fish oil" indicates fatty acid having 2 or more unsaturated bonds obtained by refining and separating of said fish oil in broad sense, and as the concrete example, EPA or DHA can be mentioned, however the invention is, not limited to them. Further, the term of "esters of highly unsaturated fatty acid" indicates the esters of said highly unsaturated fatty acid and glycerin (mono, di and/or tri glyceride), and esters of said highly unsaturated fatty acid and lower alcohol (for instance, methyl ester, ethyl ester and so on).

In the present invention, as the material of fish oil, following kinds of compound can be used. That is, crude fish oil, lower refined fish oil, highly refined fish oil, mixture of highly unsaturated fatty acid and/or its ester separating highly unsaturated fatty acid and/or esters contained in fish oil from fish oil as a mixture of plural types of highly unsaturated fatty acid and/or its ester and single substance of specific highly unsaturated fatty acid and/or its ester obtained from fish oil can be mentioned. In general, as the fish oil material, the fish oil extracted from sardine, mackerel, codfish and tuna (fish oil in a narrow sense), lower and highly refined oil of it, highly unsaturated fatty acid obtained from said fish oil and its ester are preferably used from the view of easily procuring and lower price. Further, in the present invention, the product in which more than 10 weight % of DHA and/or EPA are contained is desirably used from the view point of health promotion, and illness prevention and treatment. In this invention, the fish oil material on the market or the newly prepared fish oil materials developed for this invention can be preferably used.

Further, in the present invention, the modified fish oil type materials can be prepared by adding vinegar and/or juice of citrus fruits to the said fish oil type materials and treating. That is, when vinegar and/or a juice of citrus fruits is added to a fish oil material and stirred, then the obtained mixture (suspension) is settled, the mixture separates to upper oil layer and lower water layer. The lower water layer is removed, and the upper oil layer is recovered as the modified fish oil type material.

As the vinegar to be used in this case, both a brewing vinegar or a synthetic vinegar can be used. As the example of a brewing vinegar, a grain vinegar such as rice vinegar, raw rice vinegar and malt vinegar, apple vinegar and grape vinegar can be mentioned. And as the example of a synthetic vinegar, the diluted acetic acid by water and amino acid and saccharides are added, a vinegar to which synthetic acetic acid is added can be mentioned. As the example of a juice of citrus fruits, juice from lime, lemon, zamboa, bitter orange, grape fruit, summer orange, citron orange, sudachi orange and the concentrated juice of them can be mentioned.

In the present invention, said brewing vinegar, synthetic vinegar and juice of citrus fruits can be used alone or can be used in combination. In the case of combination use, a combination of more than two kinds of brewing vinegar, a combination of more than two kinds of synthetic vinegar, a combination of one or more kinds of brewing vinegar with one or more kinds of synthetic vinegar, a combination of one or more kinds of brewing vinegar or synthetic vinegar with one or more kinds of citrus fruits juice, or a combination of one or more kinds of citrus fruits juice can be used. Especially, vinegar from fruits such as apple vinegar is preferably used. The reason is not clear, however, in the apple vinegar, organic acids such as malic acid, citric acid, oxalic acid and tartalic acid are contained with acetic acid, and they deem to generate synergism effect. The desirable proportion of vinegar and/or citrus fruits juice to be added to the fish oil type material is 2–70 weight parts (total weight, when more than two kinds of vinegar and/or citrus fruits juice are used) to 100 parts of fish oil type material, more desirably 10–65 weight parts. When the amount of added vinegar and/or citrus fruits juice is smaller than 2 weight parts, it is difficult to remove the offensive odor of fish oil type material, and when more than 70 weight parts, acid flavor becomes too strong and deteriorates the flavor and taste of the modified fish oil type material.

As the mixing and stirring method after vinegar and/or citrus fruits juice is added to the fish oil type material, a conventional mixing stirring apparatus can be used, and as the concrete example, a propeller mixer, a turbine mixer and a homogeneous-mixer can be used. From the view point of preventing the quality change and the solidification of the fish oil type material, the desirable temperature during the mixing and stirring procedure is generally 10–25° C. Further, the mixing and stirring can be continued until the homogeneous suspension can be obtained, and the time for mixing and stirring is not restricted, however, when above mentioned conventional mixing stirring apparatuses are used, preferable mixing and stirring time is generally 1–30 minutes. And when the mixing and stirring procedure after vinegar and/or citrus fruits juice is added to the fish oil type material is carried out under the inert gas atmosphere such as nitrogen gas, the oxidation of highly unsaturated fatty acid and/or ester thereof contained in fish oil type material can be more effectively controlled, and the modified fish oil type which is more superior at remaining odorless can be obtained.

After generating the suspension by above mentioned mixing and stirring treatment, the water phase is removed. The suspension obtained by the conventional stirring procedure is settled so as to separate to the oil phase and to the water phase, and the upper oil phase is separated from the lower water layer, then the modified fish oil type material is recovered. The obtained modified fish oil type material is characterized as an odorless product which does not have an offensive odor specialized to fish oil, and the odorless state can be maintained after the long term preservation, that is, has a good preservative stability. By adding adequate amount of water, emulsion can be obtained. The fused oxygen in the water to be added at the emulsification is desirably removed previously by replacing with inert gas such as nitrogen. The desirable amount of water is 100–300% to the amount of treated oil (modified fish oil material). The obtained emulsion can be added to foods or cosmetics and the foods or the cosmetics in which DHA and EPA are contained can be obtained. The food in which 100–300 mg of DHA and EPA are contained can be obtained without spoiling the original flavor and taste of the food. Similarly, the colorless and odorless cosmetics can be obtained by adding said emulsion to a cosmetic such as milky lotion, hand cream, skin cream, makeup lotion, jelly or pack.

Further, in the present invention, vegetable oil is added to the obtained modified fish oil material and the modified fish oil composition which has good preservative stability maintaining odorless state after the long term preservation and has a good heat stability not generating offensive odor by heating is prepared. As the vegetable oil to be added to the modified fish oil material, any kinds of vegetable oil can be used as long as these are safe to the human health. As the concrete example, grape oil, rice oil, wheat germ oil, olive oil, perilla oil, safflower oil, soy bean oil, sesame oil, corn oil, cotton seed oil, salad oil and the hydrogenated oil of them can be mentioned. Among them, grape oil, rice oil, wheat germ oil, olive oil and/or perilla oil can be preferably used from the view point of preservative stability and flavor.

The desirable amount of vegetable oil to be added is 10–120 weight parts to 100 weight parts of the modified fish oil type material, and more desirably 30–100 weight parts. When the amount of vegetable oil to be added is smaller than 10 weight parts to 100 weight parts of the modified fish oil type material, the heat stability of the modified fish oil type material is not improved sufficiently. In the meanwhile, when it is more than 120 weight parts, the proportion of the modified fish oil material in the composition is decreased, consequently, the proportion of the effective highly unsaturated fatty acid and/or ester of it such as DHA or EPA in the modified fish oil composition is relatively low, and the effect of DHA or EPA in foods or cosmetics becomes difficult to be displayed fully.

Regarding to the method to add the vegetable oil to the modified fish oil type material, there is no limitation, and any kinds of methods which are possible to mix the vegetable oil homogeneously into the modified fish oil type material can be Let: used. Generally, it is possible to mix them using said conventional mixing and stirring apparatus, at the temperature lower than 30° C. and higher than the solidifying temperature of the modified fish oil type material.

And, in the present invention, at least one kind of additives selected from the group composed by collagen, starch and agar—agar can be added to the modified fish oil type material with vegetable oil at need. When at least one kind of additives selected from the group composed by collagen, starch and agar—agar is added to the modified fish oil type material, the modified fish oil composition which is superior in clearness can be obtained. At the addition of at least one additives selected from collagen, starch and agar—agar, the amount of addition (total amount, when two kinds of additives are used) is desirably to be 0.05–1 weight parts to 100 weight parts of the modified fish oil type material, and more desirably 0.05–0.2 weight parts. When the amount of addition of at least one additive selected from collagen, starch and agar—agar is bigger than one weight parts, the sedimentation is easily generated.

As a collagen, the collagen obtained from the binding tissue of animal, cartilage and tendon, or the soluble type of gelatin of them obtained by heating them in water can be used. Especially, a water soluble gelatin is preferably used from the view point of possibility of homogeneously mixing into the modified fish oil type material, easily handling and reducing cost. As a starch, potato starch, wheat starch and corn starch can be used. Especially, a granular type of starch is desirably used, from the view point of easily handling and clearness. Further, as an agar—agar, the product which is extracted from cell wall component of red algae, dehydrated and dried up is used. Solid type agar—agar, square pole type agar—agar, string type agar—agar, granular type agar—agar and powder type agar—agar can be used. However, from the view point of easily handling and clearness, the powder type agar—agar is preferably used.

The timing to add at least one additive selected from collagen, starch and agar—agar to the modified fish oil type material is not restricted. They can be added before, together with or after the addition of the vegetable oil. Especially, at least one additive selected from collagen, starch and agar—agar is desirably added before adding vegetable oil so as to obtain the modified fish oil composition which has better clearness.

The modified fish oil material and/or the modified fish oil composition of this invention obtained by above mentioned method can be added to many kinds of foods, cosmetic and others, or can be used alone as a medicine or mixed with other components. And said products to which modified fish oil material and/or the modified fish oil composition of this invention have effects for reducing of the content of cholesterol in blood, prevention and medical treatment of cardiac infarction, cerebral infarction and arteriosclerosis, improvement of learning function, antitumor, anti-allergy and improvement of eye sight according to the kind of highly unsaturated fatty acid and/or ester of it contained in the modified fish oil material and/or modified fish oil type material composition.

When the modified fish oil material and/or modified fish oil composition of this invention are added to foods, there is no limitation to the kind of food. As the concrete example, bakery products such as bread, steamed rice, noodles, soy bean processed foods such as bean curd, animal meat processed foods such as sausage and ham, confectioneries such as cake, cookie, bean-jam bun, rice cracker, ice-cream, pudding, bean-jam sweet jelly and candy, dairy products such as butter and yogurt, seasonings such as mayonnaise, dressing, soy bean sauce, soy bean paste and sauce, saccharoids such as glucose and liquid oligosaccharide, drinks such as fruits beverage, soy bean milk and vegetable juice and an arum root paste can be mentioned.

In a case of fish oil and derived highly unsaturated fatty acid and/or its ester, the upper limit of blending proportion of DHA or EPA and/or its ester to 600 g weight of bread is 20–30 mg because of it's offensive odor based on fish oil. However, in the case of the modified fish oil material and/or modified fish oil composition of this invention 100–300 mg of DHA or EPA and/or its ester can be blended to 600 g weight of bread and other foods which can fully display the excellent effect based on highly unsaturated fatty acid or its ester such as DHA or EPA.

Further, the modified fish oil material and/or modified fish oil composition (modified fish oil composition) of this invention obtained as above can be an emulsion with water using adequate emulsifier by conventional well known method, and the obtained emulsion can be used for the production of above mentioned foods, for the production of cosmetics such as milky lotion, hand cream, skin cream, massage cream, makeup lotion or pack or for any other applications

EXAMPLES

The present invention is illustrated more readily with reference to the following Examples, however, not intended to be construed to limit the scope of the invention.

Example 1
(Preparation of Modified Fish Oil Type Material)

10 weight parts of apple vinegar is added to 100 weight parts of fish oil containing 25 weight parts of DHA and mixed. The obtained suspension is settled over 24 hours and lower water layer is removed, and the odorless modified fish oil type material is obtained.

Example 2

Fused oxygen gas in water is previously removed by replacing with nitrogen gas, and 100 weight parts of said treated water is added to 100 weight parts of odorless modified fish oil type material obtained in Example 1, mixed in mixer, emulsified, then the emulsion containing odorless DHA is obtained.

Example 3

65 weight parts of apple vinegar is added to 100 weight parts of fish oil containing 45 weight % of DHA. The obtained suspension is settled over 24 hours and lower water layer is removed, and the odorless modified fish oil type material is obtained.

Example 4

Fused oxygen gas in water is previously removed by replacing with nitrogen gas, and 150 weight parts of said treated water is added to 100 weight parts of odorless modified fish oil type material obtained in Example 3, mixed in a mixer, emulsified, then the emulsion containing odorless DHA is obtained.

Example 5

30 weight parts of apple vinegar is added to 100 weight parts of fish oil containing 45 weight % of DHA ethyl ester. The obtained suspension is settled over 24 hours and lower water layer is removed, and the odorless modified fish oil type material is obtained.

Example 6

Fused oxygen gas in water is previously removed by replacing with nitrogen gas, and 200 weight parts of said treated water is added to 100 weight parts of odorless modified fish oil type material in Example 5, mixed in a mixer, emulsified, then the emulsion containing odorless DHA ethyl ester is obtained.

Example 7

Same procedures as Example 1, 3, 5 are carried out except using lemon juice instead of apple vinegar, and three kinds of odorless modified fish oil type material are obtained.

Example 8

Fused oxygen gas in water is previously removed by replacing with nitrogen gas, and 100, 200 and 300 weight parts of said treated water are added to 100 weight parts of odorless modified fish oil type materal obtained in Example 7, mixed in a mixer, emulsified, then the three kinds of emulsion containing odorless DHA are obtained.

Example 9

Same procedures as Example 1 are carried out except using the fish oil containing 20 wt % of EPA instead of the fish oil containing 25 wt % of DHA, and the odorless modified fish oil type material is obtained.

Example 10

Fused oxygen gas in water is previously removed by replacing with nitrogen gas, and 120 weight parts of said treated water is added to 100 weight parts of odorless modified fish oil type material obtained in Example 9, mixed in a mixer, emulsified, then the emulsion containing odorless EPA is obtained.

Example 11

Same procedures as Example 3 are carried out except using the fish oil containing 55 wt % of EPA instead of the fish oil containing 45 wt % of DHA, and the odorless modified fish oil type material is obtained.

Example 12

Fused oxygen gas in water is previously removed by replacing with nitrogen gas, and 220 weight parts of said treated water is added to 100 weight parts of odorless modified fish oil type material obtained in Example 11, mixed in mixer, emulsified, then the emulsion containing odorless EPA is obtained.

Example 13

Same procedures as Example 5 are carried out except using fish oil containing 90 wt % of EPA ethyl ester instead of the fish oil containing 75 wt % of DHA ethyl ester, and the odorless modified fish oil type material is obtained.

Example 14

Fused oxygen gas in water is previously removed by replacing with nitrogen gas, and 300 weight parts of said treated water is added to 100 weight parts of odorless modified fish oil type material obtained in Example 13, mixed in a mixer, emulsified, then the emulsion containing odorless EPA is obtained.

Example 15

Same procedures as Example 9, 11, 13 are carried out except using lemon juice instead of apple vinegar, and 3 kinds of oil containing the odorless modified fish oil type material are obtained.

Example 16

Fused oxygen gas in water is previously removed by replacing with nitrogen gas, and 100, 150 and 300 weight parts of said treated water are added to 100 weight parts of the odorless modified fish oil type material obtained in Example 15, mixed in a mixer, emulsified, then the 3 kinds of emulsion containing odorless EPA are obtained.

Comparative Example 1

2, 10 and 50 weight parts of apple vinegar are added to 100 weight parts of fish oil containing 25 wt % of DHA and three samples of suspension are prepared. The generation of special offensive odor of fish oil by aging of these three samples of suspension are investigated in comparison with samples of odorless modified fish oil type material obtained in Example 1, 3, 5, 9, 11, 13 and 15 and samples of emulsion obtained in Example 2, 4, 6, 10, 12, 14 and 16 of this invention. Immediately after the preparation, these samples of suspension, odorless modified fish oil type materials and emulsions of this invention are packed in sealed container and preserved in room temperature. Each samples are investigated after 2 days, 1 week and 1 month whether special offensive odor is generate. Referring to said samples of suspension, they generate special offensive odor of fish after 2 days, on the contrary the odorless modified fish oil type materials and emulsions of this invention maintained odorless state after 1 month.

Example 17

(Preparation of Modified Fish Oil Composition)
(1) 10 weight parts of rice vinegar is added to 100 weight parts of fish oil containing 27 wt % of DHA. Maintaining the temperature of the mixture at 10° C., the mixture is mixed and stirred for 5 minutes by 500 r.p.m. using a mixer having Pfaudler type 2 wing stirrer in the nitrogen gas atmosphere, and the suspension is prepared.
(2) After the suspension obtained by procedure (1) is settled for 24 hours in the nitrogen gas atmosphere and separated to a oil phase and an water phase, the lower water phase is removed. Then the upper oil phase is recovered, and the odorless modified fish oil type material is obtained.
(3) 100 weight parts of wheat germ oil is added to 100 weight % of the modified fish oil type material obtained by (2), mixed and stirred well in the nitrogen gas atmosphere and the modified fish oil composition containing DHA is prepared.
(4) Three small portions are sampled from the modified fish oil composition obtained by above (3) procedure, and heated for 10 minutes at the temperature of 60° C., 70° C. and 80° C. Whether there is offensive odor or not is investigated on each samples by five panelists according to the evaluation standard shown in Table 1. The results by five panelists are averaged and summarized in Table 2.

Example 18

(Preparation of Modified Fish Oil Composition)
(1) 5 weight parts of apple vinegar is added to 100 weight parts of fish oil containing 45 wt % of DHA. After the suspension is prepared by same mixing and stirring procedure as to (1) of Example 17, the obtained suspension is settled for 24 hours at room temperature and separated to an oil phase and an water phase. The lower water phase is removed off and then the upper oil phase is recovered, thus the odorless modified fish oil type material is obtained.
(2) 30 weight parts of brewing olive oil is added to 100 parts of modified fish oil type material obtained by procedure (1), and mixed and stirred well in the nitrogen gas atmosphere and the modified fish oil composition containing DHA is prepared.
(3) Three small portions are sampled from the modified fish oil composition obtained by above (2) procedure, and heated according to the procedure (4) of Example 17. Whether there is offensive odor or not is investigated on each samples by five panelists according to the following evaluation standard shown in Table 1. The results by five panelists are averaged and summarized in Table 2.

Example 19

(Preparation of Modified Fish Oil Composition)
(1) 10 weight parts of apple vinegar is added to 100 weight parts of fish oil containing 45 wt % of DHA. After the suspension is prepared by same mixing and stirring procedure as to (1) of Example 17, the obtained suspension is settled for 24 hours at room temperature and separated to a oil phase and an water phase. The lower water phase is removed off and then the upper oil phase is recovered, thus the odorless modified fish oil type material is obtained.
(2) 0.05 weight parts of water soluble gelatin is added to 100 parts of modified fish oil type material obtained by procedure (1) and settled for 24 hours. The fish oil which has good transparency is obtained.
(3) 100 weight parts of brewing grape oil is added to 100 parts of modified fish oil type material obtained by procedure (2), mixed and stirred well in the nitrogen gas atmosphere and the modified fish oil composition containing DHA is prepared.
(4) Three small portions are sampled from the modified fish oil composition obtained by above procedure (3), and heated according to the procedure (4) of Example 17. Whether there is offensive odor or not is investigated on each samples by five panelists according to the following evaluation standard shown in Table 1. The results by five panelists are averaged and summarized in Table 2.

Example 20

(Preparation of Modified Fish Oil Composition)
(1) 20 weight parts of apple vinegar is added to 100 weight parts of fish oil containing 70 wt % of DHA ethyl ester obtained by the ester transfer reaction of fish oil. After the suspension is prepared by same mixing and stirring procedure as to (1) of Example 17, the obtained suspension is settled for 24 hours at room temperature and separated to an oil phase a an water phase. The lower water phase is removed off and then the upper oil phase is recovered, thus the odorless modified fish oil type material is obtained.
(2) 100 weight parts of rice oil is added to 100 parts of modified fish oil type material obtained by procedure (1), and mixed and stirred well in the nitrogen gas atmosphere and the modified fish oil composition containing DHA is prepared.
(3) Three small portions are sampled from the modified fish oil composition obtained by above procedure (2), and heated according to the procedure (4) of Example 17. Whether there is offensive odor or not is investigated on each samples by five panelists according to the following evaluation standard shown in Table 1. The results by five panelists are averaged and summarized in Table 2.

Example 21

(Preparation of Modified Fish Oil Composition)
(1) The odorless modified fish oil type material is prepared by same procedure to Example 17 except using fish oil containing 25 wt % of EPA instead of fish oil containing 27 wt % of DHA, then the modified fish oil composition containing wheat germ oil is prepared by same procedure to Example 17.
(2) Three small portions are sampled from the modified fish oil composition obtained by above procedure (1), and heated according to the procedure (4) of Example 17. Whether there is offensive odor or not is investigated on each samples by five panelists according to the following evaluation standard shown in Table 1. The results by five panelists are averaged and summarized in Table 2.

Example 22

(Preparation of Modified Fish Oil Composition)
(1) The odorless modified fish oil type material is prepared by same procedure to Example 18 except using fish oil containing 55 wt % of EPA instead of fish oil containing 45 wt % of DHA, then the modified fish oil composition containing olive oil is prepared by same procedure to Example 18.
(2) Three small portions are sampled from the modified fish oil composition obtained by above procedure (1), and heated according to the procedure (4) of Example 17. Whether there is offensive odor or not is investigated on each samples by five panelists according to the following evaluation standard shown in Table 1. The results by five panelists are averaged and summarized in Table 2.

Example 23
(Preparation of Modified Fish Oil Composition)
(1) The odorless modified fish oil type material is prepared by same procedure as Example 19 except using fish oil containing 45 wt % of EPA instead of fish oil containing 45 wt % of DHA, then the modified fish oil composition containing grape oil is prepared by same procedure to Example 19.
(2) Three small portions are sampled from the modified fish oil composition obtained by above procedure (1), and heated according to the procedure (4) of Example 17. Whether there is offensive odor or not is investigated on each samples by five panelists according to the following evaluation standard shown in Table 1. The results by five panelists are averaged and summarized in Table 2.

Example 24
(Preparation of Modified Fish Oil Composition)
(1) The odorless modified fish oil type material is prepared by same procedure as Example 20 except using fish oil containing 90 wt % of EPA ethyl ester instead of fish oil containing 70 wt % of DHA ethyl ester, then the modified fish oil composition containing rice oil is prepared by same procedure to Example 20.
(2) Three small portions are sampled from the modified fish oil composition obtained by above procedure (1), and heated according to the procedure (4) of Example 17. Whether there is offensive odor or not is investigated on each samples by five panelists according to the following evaluation standard shown in Table 1. The results by five panelists are averaged and summarized in Table 2.

Example 25
(Preparation of Modified Fish Oil Composition)
(1) 10 weight parts of lemon juice is added to 100 weight parts of fish oil containing 27 wt % of DHA. After the suspension is prepared by same mixing and stirring procedure as to (1) of Example 17, the obtained suspension is settled for 24 hours at room temperature and separated to a oil phase and an water phase. The lower water phase is removed off and then the upper oil phase is recovered, thus the odorless modified fish oil type material is obtained.
(2) 30 weight parts of olive oil is added to 100 parts of modified fish oil type material obtained by procedure (1), and mixed and stirred well in the nitrogen gas atmosphere and the modified fish oil composition containing DHA is prepared.
(3) Three small portions are sampled from the modified fish oil composition obtained by above procedure (2), and heated according to the procedure (4) of Example 17. Whether there is offensive odor or not is investigated on each samples by five panelists according to the following evaluation standard shown in Table 1. The results by five panelists are averaged and summarized in Table 2.

Comparative Example 2–4
(Preparation of Fish Oil Composition)
(1) To 100 weight parts of fish oil containing 27 wt % of DHA, 5 weight parts (Comparative Example 2), 10 weight parts (Comparative Example 3) and 20 weight parts (Comparative Example 4) of apple vinegar is added. After three kinds of suspension are prepared by same mixing and stirring procedure as to (1) of Example 17, 100 weight parts of grape oil is added to said three kinds of suspension and are mixed and stirred well at 25° C. in the nitrogen gas atmosphere. Thus three samples of suspension are prepared.
(2) Three samples of suspension prepared by above mentioned procedure (1) are heated for 10 minutes at the temperature of 60° C., 70° C. and 80° C. Whether there is a generation of offensive odor is investigated by five panelists according to the evaluation standard shown in Table 1. The results by five panelists are averaged and summarized in Table 2.

TABLE 1

Odor evaluation standard for modified fish oil composition

| Point | evaluation |
| --- | --- |
| 4 | no offensive odor of fish oil, very good |
| 3 | slightly have offensive odor but not be anxious, good |
| 2 | have offensive odor of fish oil, not good |
| 1 | have strong offensive odor of fish oil, bad |

TABLE 2

| Example and Comparative Example number | contents of fish oil (cont. in fish oil[1]) | modified fish oil preparation component and proportion (weight parts) | vegetable oil[2] weight parts[3] | modified fish oil composition offensive odor by heating (10 minutes) temp.(° C.) | | |
| --- | --- | --- | --- | --- | --- | --- |
| | | | | 60 | 70 | 80 |
| Ex. 17 | DHA 27% | rice vinegar 10/ fish oil 100 | A 100 | 4 | 4 | 4 |
| Ex. 18 | DHA 45%[4] | apple vinegar 5/ fish oil 100 | B 30 | 4 | 4 | 3.6 |
| Ex. 19 | DHA 45% | apple vinegar 10/ fish oil 100 | C 100 | 4 | 4 | 3.8 |
| Ex. 20 | DHA ester 70% | apple vinegar 20/ fish oil 100 | D 100 | 4 | 3.8 | 3.8 |
| Ex. 21 | EPA 25% | rice vinegar 10/ fish oil 100 | A 100 | 4 | 4 | 4 |
| Ex. 22 | EPA 55%[4] | apple vinegar 5/ fish oil 100 | B 30 | 4 | 3.8 | 3.8 |
| Ex. 23 | EPA 45% | apple vinegar 10/ fish oil 100 | C 100 | 4 | 4 | 3.8 |
| Ex. 24 | EPA ester 90% | apple vinegar 20/ fish oil 100 | D 100 | 4 | 3.8 | 3.6 |
| Ex. 25 | DHA 27% | lemon juice 10/ fish oil 100 | D 30 | 4 | 4 | 4 |
| Co. Ex. 2 | DHA 27% | apple vinegar 5/ fish oil 100[5] | C 100[5] | 1.6 | 1.2 | 1.2 |
| Co. Ex. 3 | DHA 27% | apple vinegar 10/ fish oil 100[5] | C 100[5] | 2 | 1.2 | 1.2 |
| Co. Ex. 4 | DHA 27% | apple vinegar 20/ fish oil 100[5] | C 100[5] | 2 | 1.2 | 1 |

Remarks
[1]contents of DHA or EPA in fish oil (wt %)
[2]kinds of vegetable oil
A: wheat germ oil, B: olive oil, C: grape oil, D: rice oil
[3]weight parts of vegetable oil to 100 parts of modified fish oil
[4]water soluble gelatin is added to modified fish oil before addition of vegetable oil
[5]grape oil is directly added to the suspension of fish oil and apple vinegar From the results of above mentioned Table 2, it is clearly understood that the modified fish oil compositions of Example 17–25 of this invention have good heat stability because they do not generate the special offensive odor of fish oil even if they are heated. Said compositions of Example 17–25 are prepared by following procedure. That is, vinegar and/or juice of citrus fruits are added to the fish oil containing highly unsaturated fatty acid and/or esters thereof such as DHA or EPA and mixed, stirred and settled, then upper oil layer is recovered as the modified fish oil type material and vegetable oil is added. Further, from the results of above mentioned Example 18 and 22, when collagen is added with vegetable oil, since the transparency is improved, it is understood that the quality of the modified fish oil composition is furthermore improved.

On the contrary, in the cases of Comparative Example 2–4, it is obvious that, even if vinegar and vegetable oil are added to fish oil containing highly unsaturated fatty acid and/or esters thereof such as DHA or EPA, when vegetable oil is added directly to a suspension obtained by adding vinegar to fish oil, the fish oil composition having good heat stability can not be obtained, and it generates a special offensive fish oil odor.

The modified fish oil type materials and emulsions containing odorless DHA or EPA which are prepared according to the method of said Example 1–16 are added to many kinds of foods and cosmetics, and the flavor and taste of obtained foods, smell and color tone of cosmetics are investigated by comparison experiments.

Example 26

Manufacturing of Bread

| | |
|---|---|
| wheat powder | 100.0parts |
| yeast | 3.0parts |
| powdered milk | 3.0parts |
| sugar | 5.0parts |
| water | 70.0parts |
| yeast food | 0.1parts |
| salt | 2.0parts |
| margarine | 7.0parts |

To the bread base of above mentioned recipe, the modified fish oil type material containing odorless DHA obtained by Example 1 is blended. After kneaded, take 60 minutes floor time at 25° C., 30 minutes of bench time at room temperature, pour into a mold and maintain it in 35° C. temperature and 90% humidity for one hour for fermentation. The prepared bread base is baked in an oven and a bread is obtained. The odorless modified fish oil type materials obtained by Examples 3, 5, 7, 9, 11, 13, 15 or emulsions obtained by Examples 2, 4, 6, 8, 10, 12, 14, 16 are added to the bread base and baked a bread. Each bread contains 250 mg of DHA or EPA per 400 g of bread.

The bread to which odorless modified fish oil type material or emulsion is added, has not special offensive fish oil odor, and the flavor and taste of the bread is not different from that of ordinary bread.

Example 27

Manufacturing of Bean Curd

After soy beans are boiled, separated to soybean milk (10–12%) and bean-curd refuse. 3 g of bittern per 1 liter of soybean milk and the modified fish oil type material containing odorless DHA obtained in Example 1 and stirred in a stainless steel bowl. After settled for 20 minutes, transferred to a mold box and pressed by a hydraulic power jack and a bean curd is prepared. The odorless modified fish oil type materials obtained by Examples 3, 5, 7, 9, 11, 13, 15 or emulsions obtained by Examples 2, 4, 6, 8, 10, 12, 14, 16 are added by same procedure and bean curds are prepared. Each bean curd contains 100 mg of DHA or EPA to 100 g of bean curd.

The bean curd to which odorless modified fish oil type material or emulsion is added, has not special offensive fish oil odor, and the flavor and taste of the bean curd is not different from that of ordinary bean curd.

Example 28

Preparation of Mayonnaise

To 15 g of egg yolk, 10 g of salt and 1 g of sugar is added and stirred well, then 75 g of vegetable oil is added gradually under constant stirring. After changed to paste state, 10 g of vinegar, the odorless modified fish oil type materials obtained by Examples 1, 3, 5, 7, 9, 11, 13, 15 or emulsions obtained by Examples 2, 4, 6, 8, 10, 12, 14, 16 are added by adjusting viscosity and mayonnaise are prepared. Each mayonnaise contains 100 mg of DHA or EPA per 100 g of mayonnaise.

The mayonnaise to which odorless modified fish oil type material or emulsion is added, has not special offensive fish oil odor, and the flavor and taste of the mayonnaise is not different from that of ordinary mayonnaise.

Example 29

Preparation of Arum Root Paste 10 weight parts of vinegar is added to 100 parts of oil containing 25 wt % of DHA. Obtained white suspension is settled as to be separated to two layers. The lower vinegar base layer is filtrated and removed. 100 parts of white suspension containing DHA treated as above and 100 parts of water is mixed in a mixer and emulsified. In this case, it is desirable to replace the fused oxygen gas in water previously by nitrogen gas.

The obtained emulsion is an odorless and stabilized emulsion. By adding said emulsion to an arum root paste, the arum root paste containing DHA by high proportion which is suited as a healthy food without spoiling the flavor of arum root paste.

Example 30

Preparation of Arum Root Paste 10 weight parts of vinegar is added to 100 parts of oil containing 25 wt % of EPA. Obtained white suspension is settled as to be separated to two layers. The lower vinegar base layer is filtrated and removed. 100 parts of white suspension containing EPA treated as above and 100 parts of water is mixed in a mixer and emulsified. In this case, it is desirable to replace the fused oxygen gas in water previously by nitrogen gas.

The obtained emulsion is an odorless and stabilized emulsion. By adding said emulsion to an arum root paste, the arum root paste contains EPA by high proportion which is suited as a healthy food without spoiling the flavor of arum root paste.

Example 31

The odorless modified fish oil type materials obtained by Examples 1, 3, 5, 7, 9, 11, 13, 15 or emulsions obtained by Examples 2, 4, 6, 8, 10, 12, 14, 16 are added to ice cream, yogurt, margarine and soy bean paste. 0.2 weight parts of DHA or ethyl ester of it or EPA or ethyl ester of it are contained in 100 weight parts of ice cream, 100 weight parts of yogurt, 10 weight parts of margarine and 100 weight parts of soy bean paste. The flavor and taste of each foods are checked, and all of these foods do not have a special offensive fish oil odor and are not different from the conventional ones.

Example 32

| | |
|---|---|
| liquid paraffin | 45 weight parts |
| stearyl alcohol | 7 weight parts |
| stearic acid | 3 weight parts |
| squarane | 7 weight parts |
| vaseline | 13 weight parts |
| propylene glycol | 12 weight parts |
| lanoline hydrate | 3 weight parts |

10 weight % of the odorless modified fish oil type materials obtained by Examples 1, 3, 5, 7, 9, 11, 13, 15 or emulsions obtained by Examples 2, 4, 6, 8, 10, 12, 14, 16 are added respectively to the mixture of above mentioned recipe melted at the temperature of 70° C. and are emulsified homogeneously, cooled down and cream products are obtained. Color and smell are checked just after and one month after the preparation, and these products do not have color change and a special offensive fish oil odor.

Example 33

| | |
|---|---|
| ethyl alcohol | 15 weight parts |
| propylene glycol | 12 weight parts |
| glycerin | 3 weight parts |
| stearic acid | 2 weight parts |
| cetyl alcohol | 1 weight parts |
| pure water | 59 weight parts |

5.0 weight % of the odorless modified fish oil type materials obtained by Examples 1, 3, 5, 7, 9, 11, 13, 15 or 10.0 weight % of emulsions obtained by Examples 2, 4, 6, 8, 10, 12, 14, 16 are added respectively to the mixture of above mentioned proportion, stirred, mixed and milky lotion products are obtained. Color and smell of these products are checked just after and one month after the preparation, and these products do not have color change and a special offensive fish oil odor.

Example 34
(Addition of Modified Fish Oil Composition to Sweetners)

(1) 20 weight parts of the before heat treatment modified fish oil composition obtained in Example 17 and 2 weight parts of emulsifier (product of Mitsubishi Chemical Co., Ltd. "Sugar Ester S1170") are added to 78 weight parts of liquid sweetners on market, mixed for 3 minutes by 10,000 r.p.m. in a homogeneous mixer and an artificial sweetners containing the modified fish oil composition is prepared.

(2) 5 weight parts of artificial sweetners obtained in procedure (1) is poured into 100 weight parts of 80° C. hot water and stirred, and whether there is a special fish oil odor or not is estimated by five panelists according to the evaluation standard shown in Table 1. Total points by five panelists is 18, therefore, a special offensive fish oil odor is not generated.

Example 35–42
(Addition of Modified Fish Oil Composition to Sweetners)

(1) Artificial sweetners containing the modified fish oil composition are prepared by same procedure of Example 34, except using the before heat treatment modified fish oil composition obtained in Examples 18–25.

(2) 5 weight parts of artificial sweetners obtained in procedure (1) is poured into 100 weight parts of 80° C. hot water and stirred, and whether there is a special fish oil odor or not is estimated by five panelists according to the evaluation standard shown in Table 1. Total points by five panelists is 19, therefore, a special offensive fish oil odor is not generated.

Example 43
(Addition of Modified Fish Oil Composition to Milk)

1 weight parts of the before heat treatment modified fish oil composition obtained in Example 17 is added to 100 weight parts of milk, mixed well, then heated for 30 minutes at 63° C. Preserved in sealed container at room temperature for 7 days. After 7 days, the container is opened and whether there is a special fish oil odor or not is estimated by five panelists according to the evaluation standard shown in Table 1. Total points by five panelists is 20, therefore, a special offensive fish oil odor is not generated and the taste of milk is not changed.

Example 44–48
(Addition of Modified Fish Oil Composition to Milk)

Samples of milk containing the modified fish oil composition are prepared by same procedure as Example 43, except using the before heat treatment modified fish oil composition obtained in Examples 18–22, then heated for 30 minutes at 63° C. Preserved in sealed containers at room temperature for 7 days. After 7 days, these containers are opened and whether there is a special fish oil odor or not for each samples are estimated by five panelists according to the evaluation standard shown in Table 1. Total points by five panelists for these samples are bigger than 18, therefore, a special offensive fish oil odor is not generated and the taste of these samples of milk are not changed.

Example 49
(Manufacturing of Bread Containing Modified Fish Oil Composition)

(1) At the kneading process of starting material of bread (100 weight parts of wheat powder, 3 weight parts of yeast, 3 weight parts of powdered milk, 5 weight parts of sugar, 70 weight parts of water, 2 weight parts of salt, 7 weight parts of margarine), the modified fish oil composition obtained in Example 17 is added to wheat powder, kneaded, fermentated and the bread base is prepared. After taking 60 minutes floor time, the bread base is divided, and take 30 minutes of bench time at room temperature. Then poured into a mold, maintained at the condition of 38° C. temperature and 90% humidity for 30 minutes then bakes in oven (190° C., 45 minutes) and obtain a bread.

(2) Whether there is a special fish oil odor or not for the bread obtained in above mentioned procedure (1) is estimated by five panelists according to the evaluation standard shown in Table 1. Total points by five panelists for the bread is 19, therefore, a special offensive fish oil odor is not generated and the bread has a good flavor. The outer appearance, inner appearance, texture and taste of the bread are good, and there is no difference between ordinary bread baked without adding modified fish oil composition.

Example 50–57
(Manufacturing of Bread Containing Modified Fish Oil Composition)

Samples of bread containing the modified fish oil composition are prepared by same procedure as Example 49, except using the before heat treatment modified fish oil composition obtained in Examples 18–25. Whether there is a special fish oil odor or not for each breads are estimated by five panelists according to the evaluation standard shown in Table 1. Total points by five panelists for these samples are bigger than 18, therefore, a special offensive fish oil odor is not generated and the taste of these breads are good. The outer appearance, inner appearance, texture and taste of the breads obtained in Examples 50–57 are good.

Example 58
(Manufacturing of Bean Curd Containing Modified Fish Oil Composition)

(1) After soy beans are boiled, separated to soybean milk and bean-curd refuse. At the temperature of 70–75° C., 0.003 weight parts of bittern and 0.3 weight parts of modified fish oil composition are added to 1 weight parts of soybean milk (10–12%), and stirred in a stainless steel bowl. After settled for 20 minutes, transferred into a mold box and pressed by a hydraulic power jack, thus a bean curd is manufactured. (2) Whether there is a special fish oil odor or not for the bean curd obtained in above mentioned procedure (1) is estimated by five panelists according to the evaluation standard shown in Table 1. Total points by five panelists for the bean curd is 20, therefore, a special offensive fish oil odor is not generate, and the obtained bean curd has good flavor. The taste of the obtained bean curd are good, and there is no difference between ordinary bean curd manufactured without adding modified fish oil composition.

Example 59–66
(Manufacturing of Bean Curd Containing Modified Fish Oil Composition)

Samples of bean curd containing the modified fish oil composition are prepared by same procedure as Example 58, except using the before heat treatment modified fish oil composition obtained in Examples 18–25. Whether there is a special fish oil odor or not for each bean curd are estimated by five panelists according to the evaluation standard shown in Table 1. Total points by five panelists for these samples are bigger than 19, therefore, a special offensive fish oil odor is not generated and the taste of these bean curds are good, and there is no difference between ordinary bean curd manufactured without adding modified fish oil composition.

Example 67
(Preparation of Emulsion Containing Modified Fish Oil Composition)

5 weight parts of modified fish oil composition obtained in Example 17 is added to 100 weight parts of the starting material of an emulsion (15 weight parts of ethyl alcohol, 12 weight parts of propylene glycol, 3 weight parts of glycerin, 2 weight parts of stearic acid, 1 weight parts of cetyl alcohol and 59 parts of water), mixed and stirred well at room temperature and an emulsion is prepared. The obtained emulsion is odorless and does not have special offensive fish oil odor, and after 1 month preservation does not generate offensive odor.

Effect of Invention

The modified fish oil type composition of this invention which can be obtained by adding at least one additive selected from vinegar and citrus fruits juice to the fish oil type material composed by at least one additive selected from a group composed by fish oil, highly unsaturated fatty acid derived from fish oil and ester of it, mixing, stirring then settling and removing water phase, and the modified fish oil composition obtained by adding vegetable oil to said material, can be applied to many kinds of field such as foods, cosmetics and medicines, because they have good preservation stability and maintain odorless state not only immediately after the preparation but also after long term preservation, further they have good heat stability which does not generate offensive odor when heated. And, since the modified fish oil type material and modified fish oil composition of this invention contain highly unsaturated fatty acid and/or esters thereof such as DHA or EPA which are useful for human body by large quantity, they are effective for reducing the content of choresterol in blood, for the prevention and the medical treatment of cardiac infraction, cerebral infraction and arteriosclerosis, for improvement of learning function, antitumor effect, anti-allergy effect and improvement of eye sight. Further, in the present invention, when at least one additive selected from the group composed by collagen, starch and agar—agar are added and used together with the vegetable oil, the modified fish oil composition which has more excellent clearness can be obtained.

What is claimed is:

1. A substantially non-aqueous, odorless, and stabilized modified fish oil comprising highly unsaturated fatty acid and/or esters thereof and which is the product resulting from removing the water phase from a mixture of vinegar and/or citrus fruits juice and fish oil containing highly unsaturated fatty acid and/or esters thereof.

2. An emulsion comprising the stabilized modified fish oil as set forth in claim 1, and added water.

3. Foods or cosmetics to which the emulsion obtained in claim 2 is added.

4. Foods or cosmetics to which the oil obtained in claim 1 is added.

5. A modified fish oil composition comprising vegetable oil and the stabilized modified fish oil of claim 1.

6. The stabilized modified fish oil according to claim 5, further comprising at least one additive selected from the group consisting of collagen, starch and agar—agar.

7. The modified fish oil composition of claim 5 or claim 6, wherein the proportion of vegetable oil is 10–120 weight parts to 100 weight parts of the stabilized modified fish oil.

8. The modified fish oil composition of claim 6, wherein the proportion of said at least one additive is 0.05–1 weight parts to 100 weight parts of the stabilized modified fish oil.

9. The stabilized modified fish oil according to claim 8, wherein the additive comprises collagen.

10. The stabilized modified fish oil according to claim 8, wherein the additive comprises starch.

11. The stabilized modified fish oil according to claim 8, wherein the additive comprises agar—agar.

12. Foods or cosmetics to which the modified fish oil type composition of claim 5 or claim 6 is added.

13. The stabilized modified fish oil according to claim 1, which is the product resulting from removing the water phase from a mixture of vinegar and said fish oil.

14. The stabilized modified fish oil according to claim 1, which is the product resulting from removing the water phase from a mixture of citric fruits juices and said fish oil.

15. A method for preparation of modified fish oil type material containing odorless and stabilized highly unsaturated fatty acid and/or esters thereof comprising, adding and mixing vinegar and/or citrus fruits juice to the fish oil containing highly unsaturated fatty acid and/or esters thereof, then by removing the water phase.

16. A method for preparation of modified fish oil type composition containing highly unsaturated fatty acid and/or esters thereof comprising, adding and mixing vinegar and/or citrus fruits juice to the fish oil containing highly unsaturated fatty acid and/or esters thereof, removing the water phase and recovering the oil phase as the modified fish oil type material, then adding vegetable oil to said modified fish oil type material.

17. The method for preparation of modified fish oil type composition according to claim 16, wherein the proportion of vegetable oil to be added is 10–120 weight parts to 100 weight parts of modified fish oil type material.

18. A method for preparation of modified fish oil type composition containing highly unsaturated fatty acid and/or esters thereof comprising, adding and mixing vinegar and/or citrus fruits juice to the fish oil containing highly unsaturated fatty acid and/or esters thereof, removing the water phase and recovering the oil phase as the modified fish oil type material, then adding at least one additive selected from the group composed by collagen, starch and agar—agar, and vegetable oil to said modified fish oil type material.

19. The method for preparation of modified fish oil type composition according to claim 18, wherein the proportion of said at least additive to be added is 0.05–1 weight parts to 100 weight parts of modified fish oil type material.

* * * * *